(12) United States Patent
Davis et al.

(10) Patent No.: US 10,894,616 B2
(45) Date of Patent: Jan. 19, 2021

(54) ADJUSTABLE INTERIOR MOCKUP

(71) Applicant: Textron Innovations, Inc., Providence, RI (US)

(72) Inventors: David Wayne Davis, Wichita, KS (US); Todd Thisius, Cheney, KS (US); Chris Trask, Wichita, KS (US); Chris Pinkerton, Derby, KS (US)

(73) Assignee: Textron Innovations, Inc., Providence, RI (US)

( * ) Notice: Subject to any disclaimer, the term of this patent is extended or adjusted under 35 U.S.C. 154(b) by 974 days.

(21) Appl. No.: 14/510,020

(22) Filed: Oct. 8, 2014

(65) Prior Publication Data
US 2016/0101875 A1 Apr. 14, 2016

(51) Int. Cl.
*B64F 5/00* (2017.01)
*B64F 5/10* (2017.01)
*G09B 25/02* (2006.01)

(52) U.S. Cl.
CPC .................. *B64F 5/10* (2017.01); *B64F 5/00* (2013.01); *G09B 25/02* (2013.01)

(58) Field of Classification Search
CPC . B64F 5/0009; B64F 5/00; B64F 5/10; G09B 25/00
USPC .......................................................... 434/72
See application file for complete search history.

(56) References Cited

U.S. PATENT DOCUMENTS

| | | | | |
|---|---|---|---|---|
| 2,332,625 | A * | 10/1943 | Ellis | B64F 5/0009 269/116 |
| 5,884,646 | A * | 3/1999 | Ju | E04H 15/64 135/135 |
| 7,185,667 | B2 * | 3/2007 | Rottmann | E04H 15/18 135/119 |
| 7,270,297 | B2 | 9/2007 | Schaefer et al. | |
| 7,754,819 | B2 * | 7/2010 | Chino | C08F 8/14 525/326.1 |
| 2005/0236026 | A1 * | 10/2005 | Anticoli | E04H 15/40 135/128 |
| 2010/0148002 | A1 | 6/2010 | Park et al. | |
| 2012/0040159 | A1 * | 2/2012 | Pechnik | B29C 70/086 428/213 |
| 2013/0206710 | A1 * | 8/2013 | Roschat | B64F 5/00 211/13.1 |
| 2015/0314583 | A1 * | 11/2015 | Jess | B29C 31/085 156/324.4 |

* cited by examiner

*Primary Examiner* — James B Hull
*Assistant Examiner* — Jennifer L Korb
(74) *Attorney, Agent, or Firm* — Erise IP, P.A.

(57) ABSTRACT

A system and method for simulating a structure is disclosed. An adjustable interior mockup for simulating a structure has a base with a first elongated side and a second elongated side, the first elongated side being nonadjacent the second elongated side; and an adjustable frame secured to the base. The adjustable frame includes a plurality of girder members secured along the first and second elongated sides to form an arc; a plurality of brackets; a plurality of arms having a latch attached to one end; and a sheet of fabric. The girders are securely fastened along the first elongated side of the base at predetermined intervals; the brackets are secured to the girders; the arms are received by the brackets and adjustably anchored to the girders via a fastener; and the latches engage the sheet of fabric, thus pulling the fabric into a shape that resembles the structure.

11 Claims, 9 Drawing Sheets

ADJUSTABLE INTERIOR MOCKUP

BACKGROUND

The vehicular design industry continually strives to make vehicles lighter and more fuel efficient. The use of composite materials in the design and manufacture process has created a multitude of options in optimizing a vehicle's shape. Vehicular shapes have since become increasingly more complex. Ensuring a sufficient amount of usable space within the vehicle is an important consideration with new vehicle shapes. Both space maximization and passenger comfort are a concern. Of particular interest is aircraft fuselage design.

Currently, reviewing digital mockups of the interior of an aircraft is the dominant method of performing an early evaluation of new aircraft design concepts. Two-dimensional floor plans provide preliminary dimensions for the inside of the aircraft. Three-dimensional models may also be used to get a better idea of how the inside of the aircraft might look, and more accurately show the amount of space that passengers are allotted inside the aircraft. Persons having an expert level of aircraft knowledge are required to read and interpret the plans. It is eventually necessary to have a life-size interior mockup of the aircraft in order for the designers and engineers to make educated decisions regarding spacing of seats, overhead bins, et cetera.

Traditional interior mockups use machined materials to represent interior surfaces of an aircraft to allow designers to make cabin-sized adjustments to proposed interior arrangements before the final aircraft is built. The traditional mockups require significant time to construct, and are expensive. Furthermore, once the original mockup has been constructed, tests often identify unanticipated customer comfort aspects. The resulting modifications require an entire new set of machined materials. This re-fabrication adds to the cost, and can also delay projects.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented below.

In one embodiment, an adjustable interior mockup is disclosed for simulating a three-dimensional structure. The mockup includes a modifiable structural frame having a plurality of arms adjustably secured thereto, and a flexible panel. The plurality of arms is engagable with the flexible panel to simulate the three-dimensional structure.

In one embodiment, an adjustable interior mockup for simulating a structure has a base, an adjustable frame and a sheet of fabric. The base has a first elongated side and a second elongated side, where the first elongated side is nonadjacent to the second elongated side. The adjustable frame is secured to the base and includes a plurality of girder members secured to the base and a plurality of arms adjustably secured to the girder members.

In another embodiment, an adjustable interior mockup for simulating a structure has a base with a first elongated side and a second elongated side, the first elongated side being nonadjacent the second elongated side; and an adjustable frame secured to the base. The adjustable frame includes a plurality of girder members secured along the first and second elongated sides to form an arc; a plurality of brackets; a plurality of arms having a latch attached to one end; and a sheet of fabric. The girders are securely fastened along the first elongated side of the base at predetermined intervals; the brackets are secured to the girders; the arms are received by the brackets and adjustably anchored to the girders via a fastener; and the latches engage the sheet of fabric, thus pulling the fabric into a shape that resembles the structure.

In still another embodiment, a method for modifying a structural design is disclosed. The method has the following steps: (a) providing an adjustable frame attached to a base, (b) providing a sheet of fabric; (c) determining a first desirable change in the design of the structure; (d) adjusting the length of the arms having latches on the end to simulate the desired changes; (e) determining a second desirable change in the design of the structure; and (f) adjusting the length of the contoured branches to simulated the desired changes. The adjustable frame includes a plurality of girder members secured along the first and second elongated sides to form an arc; a plurality of brackets; a plurality of arms having a latch attached to one end; and a plurality of contoured branches. The girders are securely fastened along the first elongated side of the base at predetermined intervals; the brackets are secured to the girders; and the arms are received by the brackets and adjustably anchored to the girders via a fastener. The latches on the ends of the arms engage the fabric, pulling the fabric into the desired shape, and the contoured branches press against the fabric thereby simulating depressions in the design. The steps for adjusting the length of the arms include: loosening the fastener; moving the arm away from or towards the center of the adjustable frame as desired; and tightening the fastener to secure the arm in place. Position indicators on the arms indicate the length of the arm.

BRIEF DESCRIPTION OF THE DRAWINGS

Illustrative embodiments of the present invention are described in detail below with reference to the attached figures.

DETAILED DESCRIPTION

Embodiments of the present invention provide a type of adjustable interior cabin mockup assembly for modeling the actual size and shape of a vehicle. While reference herein is made to the use of an adjustable mockup assembly in aircraft design and manufacture, it shall be understood that the invention may have application in other industries needing a cost-effective and quicker method of creating models of products.

Figure 1:
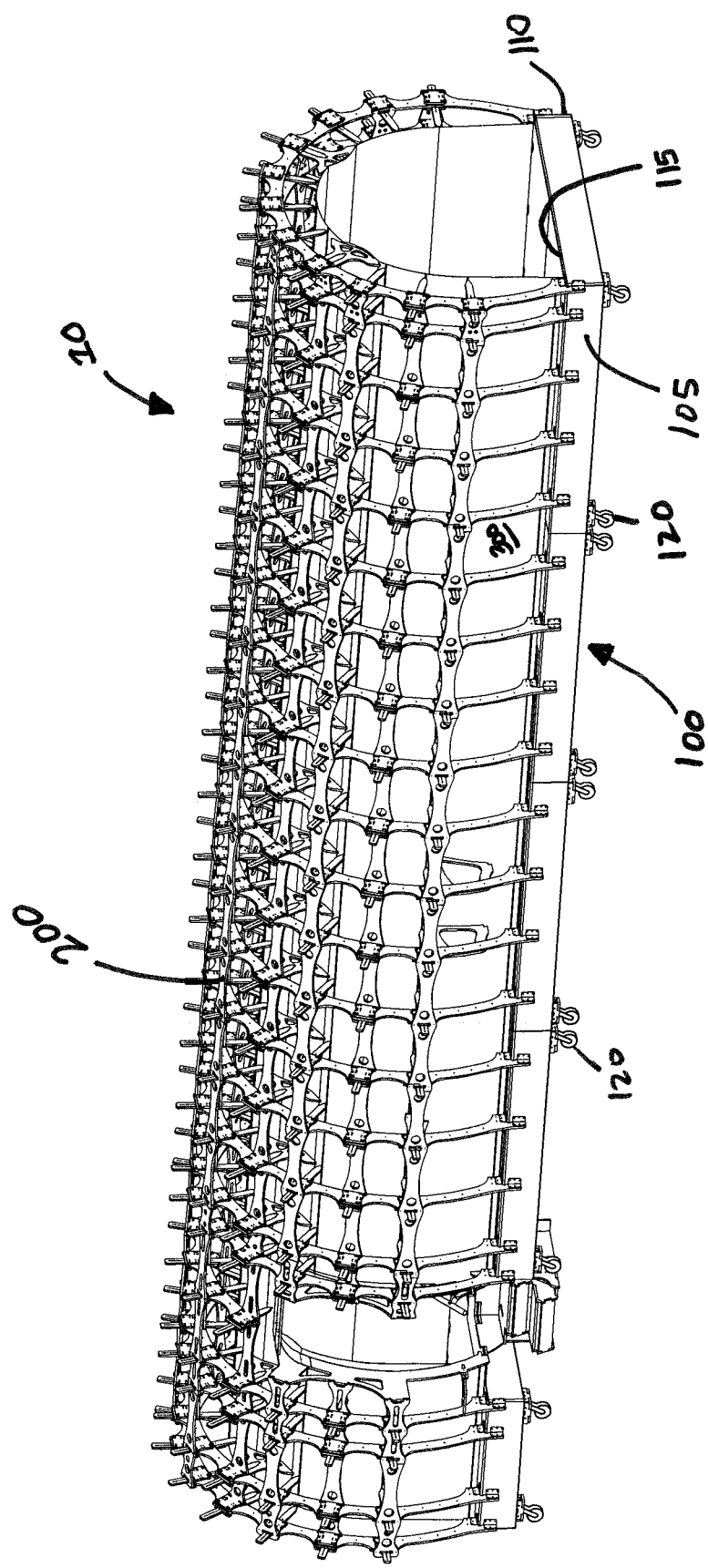
FIG. 1 is a perspective view of the invention, according to one embodiment.

With reference to FIG. 1, in one embodiment, an adjustable interior mockup assembly 10 includes a base 100, an adjustable frame 200, and a flexible panel 300, which, in an embodiment, is an elastic fabric material. It should be noted that the term "panel" as used herein, unless otherwise specified, may comprise any material that is flexible when acted on by forces and is thus repositionable.

Figure 3:
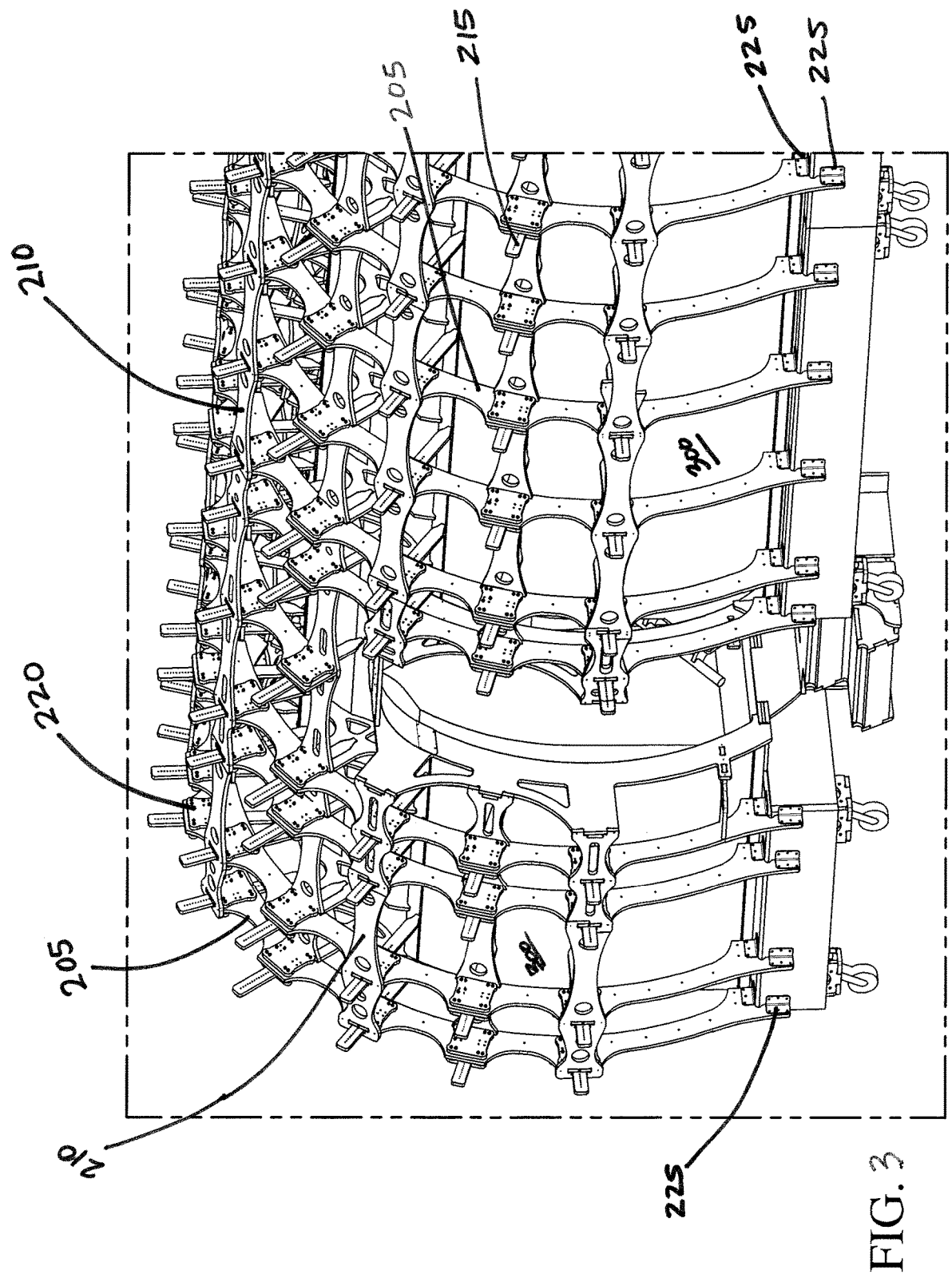
FIG. 3 is another close-up perspective view of the invention of FIG. 1 showing the frame in greater detail with a representative cutout.

The base 100 may have at least an upper flat surface 115 parallel to the ground. The base 100 supports the weight of the frame 200 as shown in FIGS. 1&3. The base may further include a first side surface 105 and a second side surface 110 opposite the first side surface 105 to aid in attaching the frame 200 to the base 100 by receiving fasteners 225. Wheels 120 may be attached to the base 100 for easy transportation of the mockup assembly 10.

As shown in the figures, the adjustable frame 200 is a complex structure for supporting the flexible panel 300 and may include a plurality of longitudinally-spaced, radially extending girders 205 (or frame stations 205), a plurality of laterally-spaced struts 210 (or stringers 210) spanning between and secured to the girders 205, and a plurality of arms 215 outwardly supported by double-sided brackets 220 that flank the girders 205. The arms 215 are held into place via mechanical couplers 230, for example, clamps or vices. The girders 205 serve as the main structural component of the mockup assembly 10. The girders 205 extend upwardly and outwardly from the base 100, and may be shaped to resemble any general structure to be simulated. For example, the girders 205 may be curved to resemble the circular shape of an aircraft cabin, as shown in FIGS. 2-8. Alternately, the girders 205 may take a square shape, or be more oval in shape.

The girders 205 may take a variety of forms to create the shape of the structure. For example, each girder 205 may be formed from a single member that extends from the base's first side 105 to the second side 110. Alternately, the girder 205 may be formed of multiple members extending from either side 105, 110 of the base 100 and spliced together as necessary. The girders 205 may be constructed of any appropriate material, including but not limited to wood, steel, hard plastic, et cetera. Each girder 205 may be fastened to the base 100 using any appropriate method. For example, L-shaped fastening plates 225 (as shown in FIG. 3) may be secured to the girders 205 and the base 100 to hold the girders 205 in place.

Multiple girders 205 may be attached along each of the first and second sides 105, 110 of the base 100 at predefined intervals. The intervals between the girders 205 may depend on the length of the structure and the shape of the structure being replicated. In some embodiments, additional girders 205 may be required on the sides of the base 100 adjacent the first and second sides 105, 110.

Figure 2:
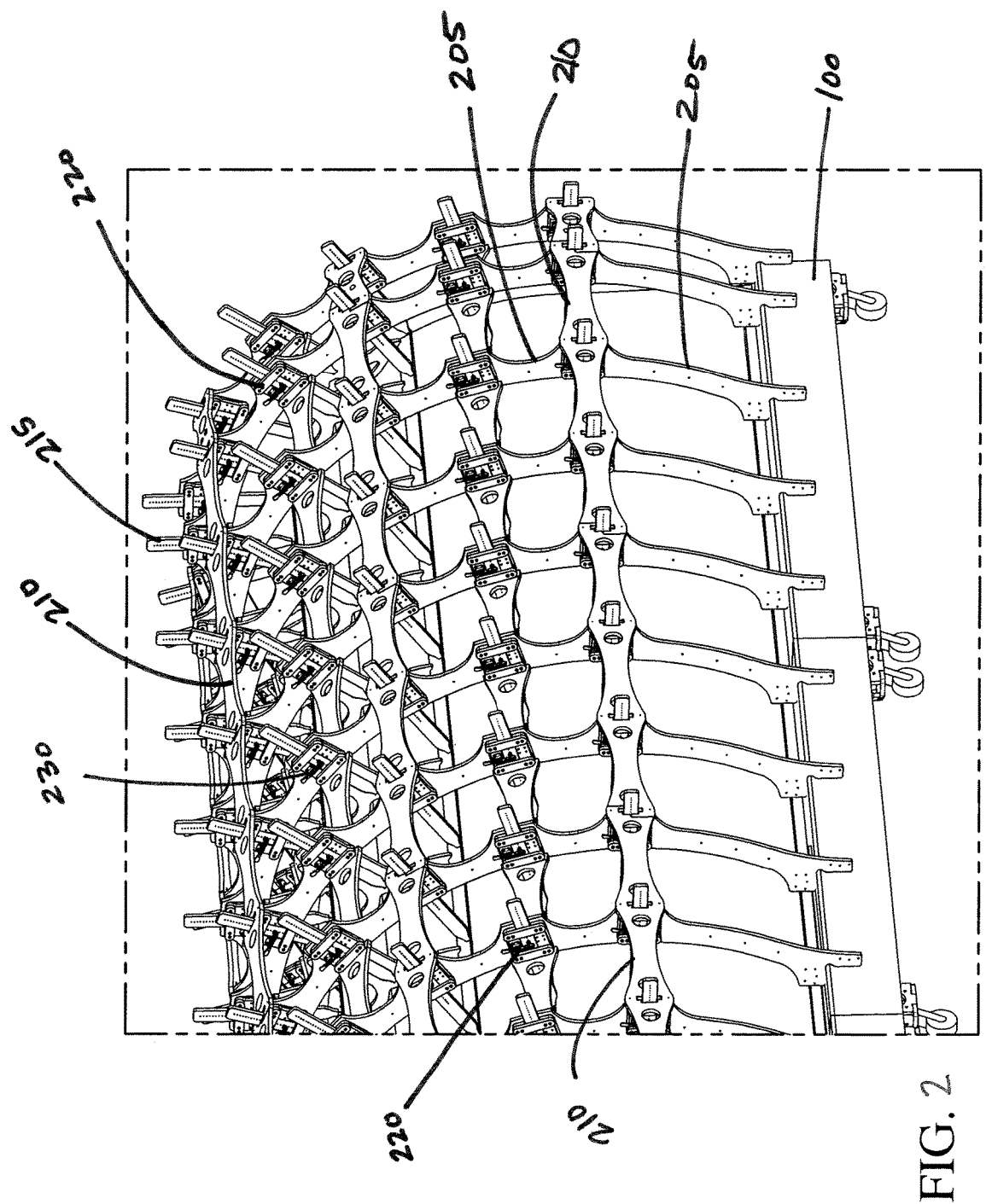
FIG. 2 is a close-up perspective view of the invention of FIG. 1 showing the frame in greater detail.
Figure 4:
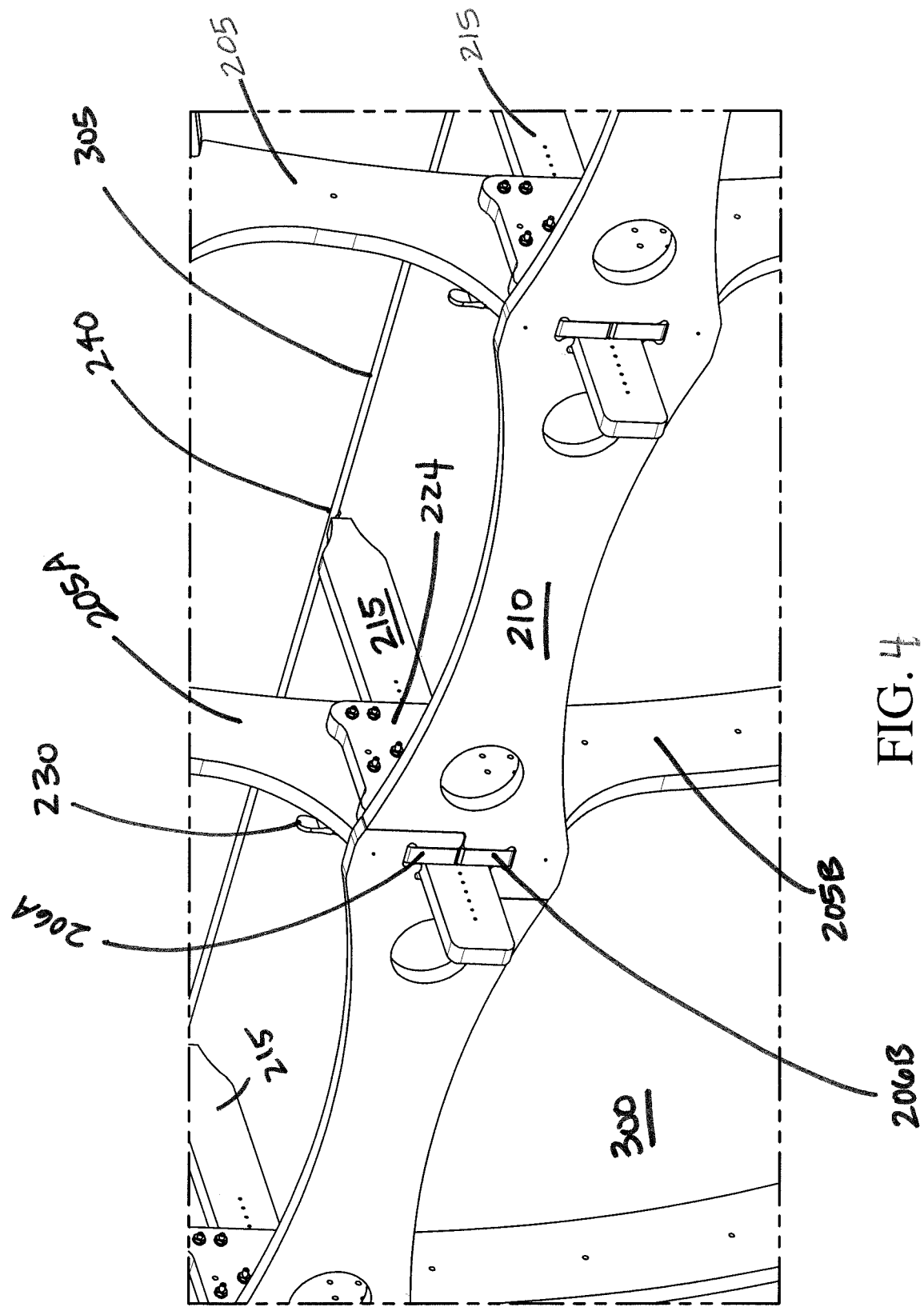
FIG. 4 is another close-up perspective view of the invention of FIG. 1 showing a strut member.

The frame 200 is further fortified by the strut members 210 that span across the girders 205 lengthwise along the first and second sides 105, 110. As illustrated in FIGS. 2-4, the struts 210 may span across several girders 205 as appropriate. FIG. 4 illustrates how the struts 210 may aid in splicing together multiple girder members 205A, 205B. Outwardly projecting ends 206A, 206B may stick out of the girders 205 and be configured to fit into holes cut into the struts 210 for receiving the ends 206A, 206B. The struts 210 may additionally have cut-outs configured to receive and support arms 215 as shown in FIG. 4. The struts 210 may be generally held into place via the ends 206A, 206B and the arms 215, though the strut 210 may additionally be secured into place using any acceptable fastening means.

Figure 5:
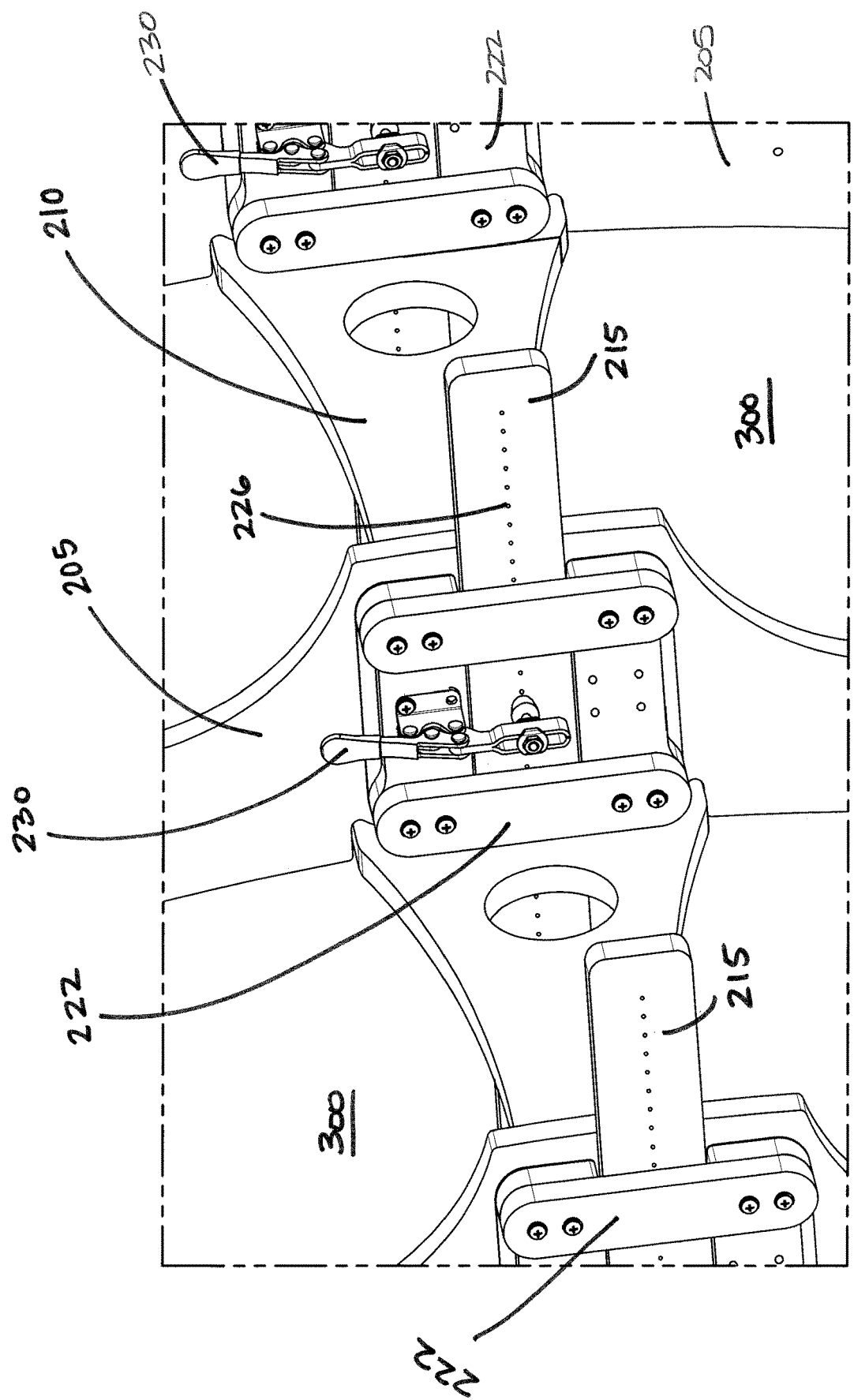
FIG. 5 is yet another close-up perspective view of the invention of FIG. 1 showing the front face of a bracket and a clamp.
Figure 7:
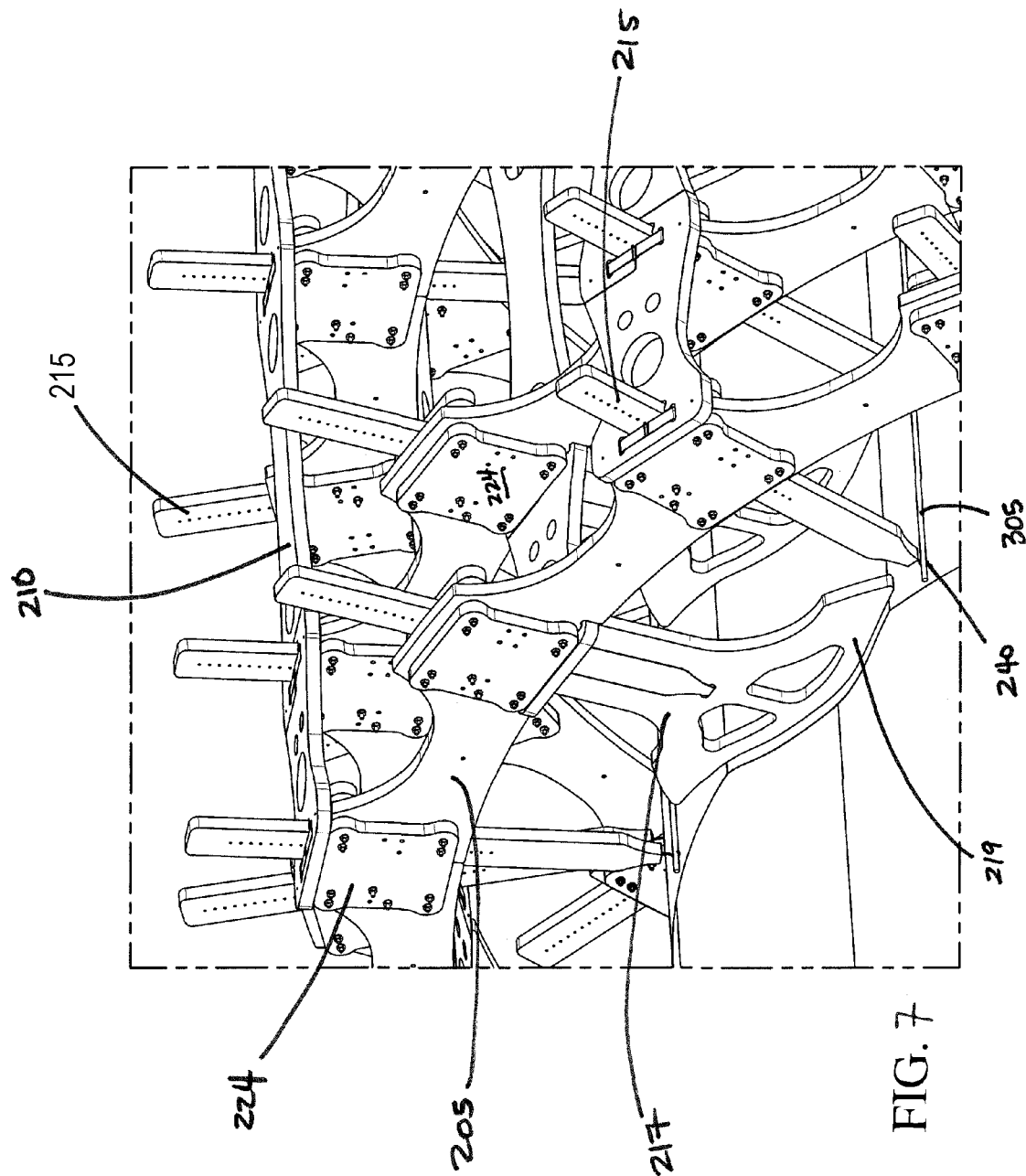
FIG. 7 is still yet another close-up perspective view of the invention of FIG. 1, showing a contoured branch.
Figure 8:
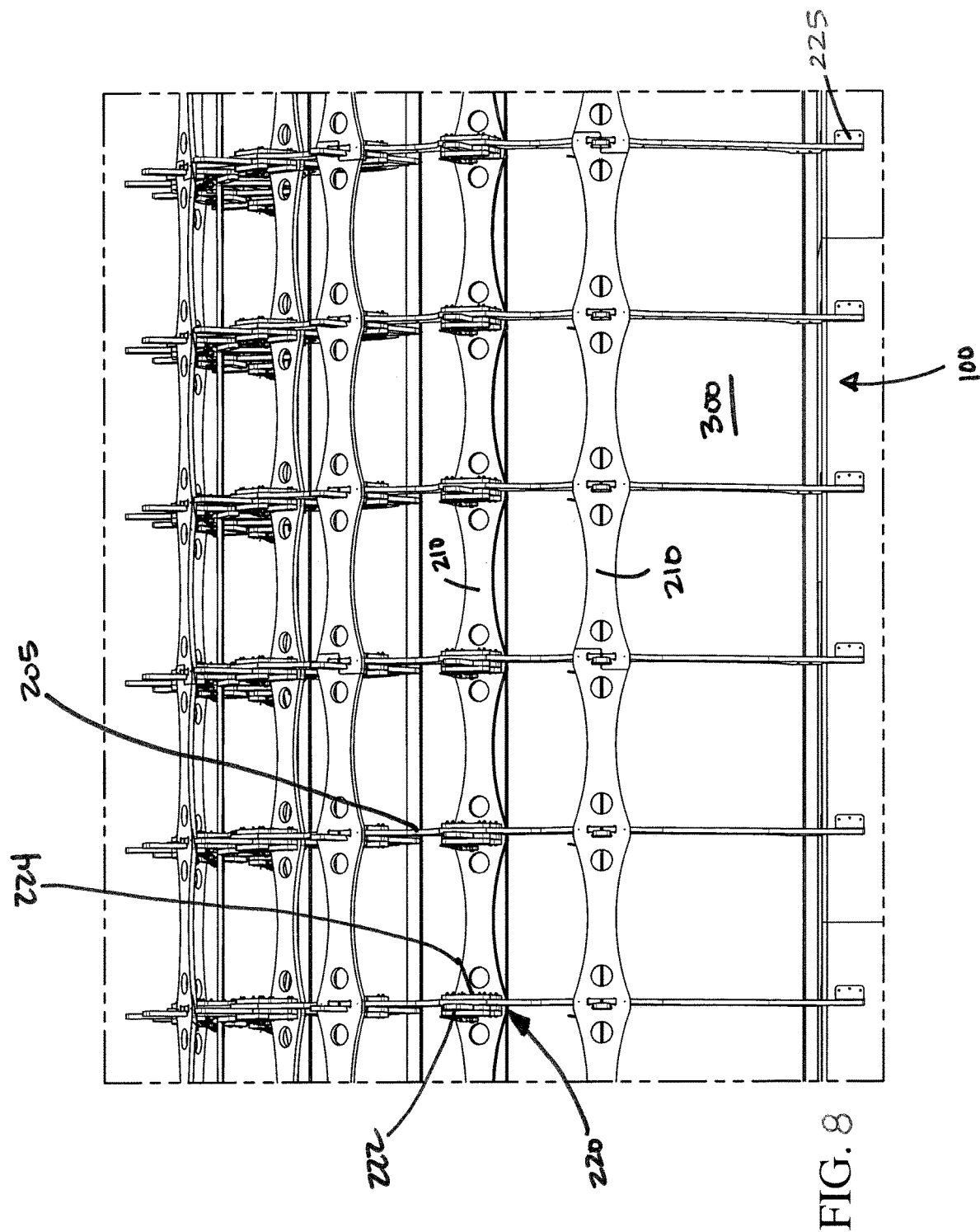
FIG. 8 is a side view of the invention of FIG. 1.

The arms 215 may be further supported by the double-sided brackets 220 secured to the girders 205. Each bracket 220 may include a front support 222 (as shown in FIG. 5) which receives the arm 215 and a back support 224 (as shown in FIG. 7). The brackets 220 flank the girders 205 such that the front support 222 is secured to one side of the girder 205 and the back support is secured to the opposite side, as illustrated in FIG. 8. A hole in the center of the front support 222 may receive the arm 215, as shown in FIG. 5. The back support 224 may, in addition to the struts 210, aid in splicing together multiple girders 205. However, the bracket 220 may include only a front support 222 secured directly to the girder 205, if the back support 224 is unnecessary.

The arm 215 may be held in place via the mechanical coupler 230 such as a clamp, for example. The clamp 230 may be secured to the bracket 220 to hold the arm 215 in the correct position. The length of the arm 215 may be adjusted by releasing the clamp 230 and moving the arm 215 back and forth within the hollowed center of the bracket's front support 222. For ease of reference, the arms 215 may be equipped with position indicators 226 to indicate to the user the position of the clamp 230. It may thus be apparent that a single adjustable frame 200 may be able to simulate several differently sized structures based on the specifications of a particular project. For example, in the aircraft fuselage illustrated in the figures, sliding the arm 215 further through the bracket's front support 222 decreases the size of the mockup fuselage; withdrawing the arm 215 increases the size of the fuselage. It may be appreciated by a person of skill in the art that adjusting the lengths of the arms 215 may be an automated process. Such automation may allow for quicker and more accurate placement and adjustment of the arms 215.

Although the fuselage may not have a straight shape, the shape of the fuselage can be replicated by varying the lengths of the arms 215 as necessary. It will also be noted that revisions in the structure can be easily accomplished simply by changing the lengths of the arms 215.

Figure 6A:
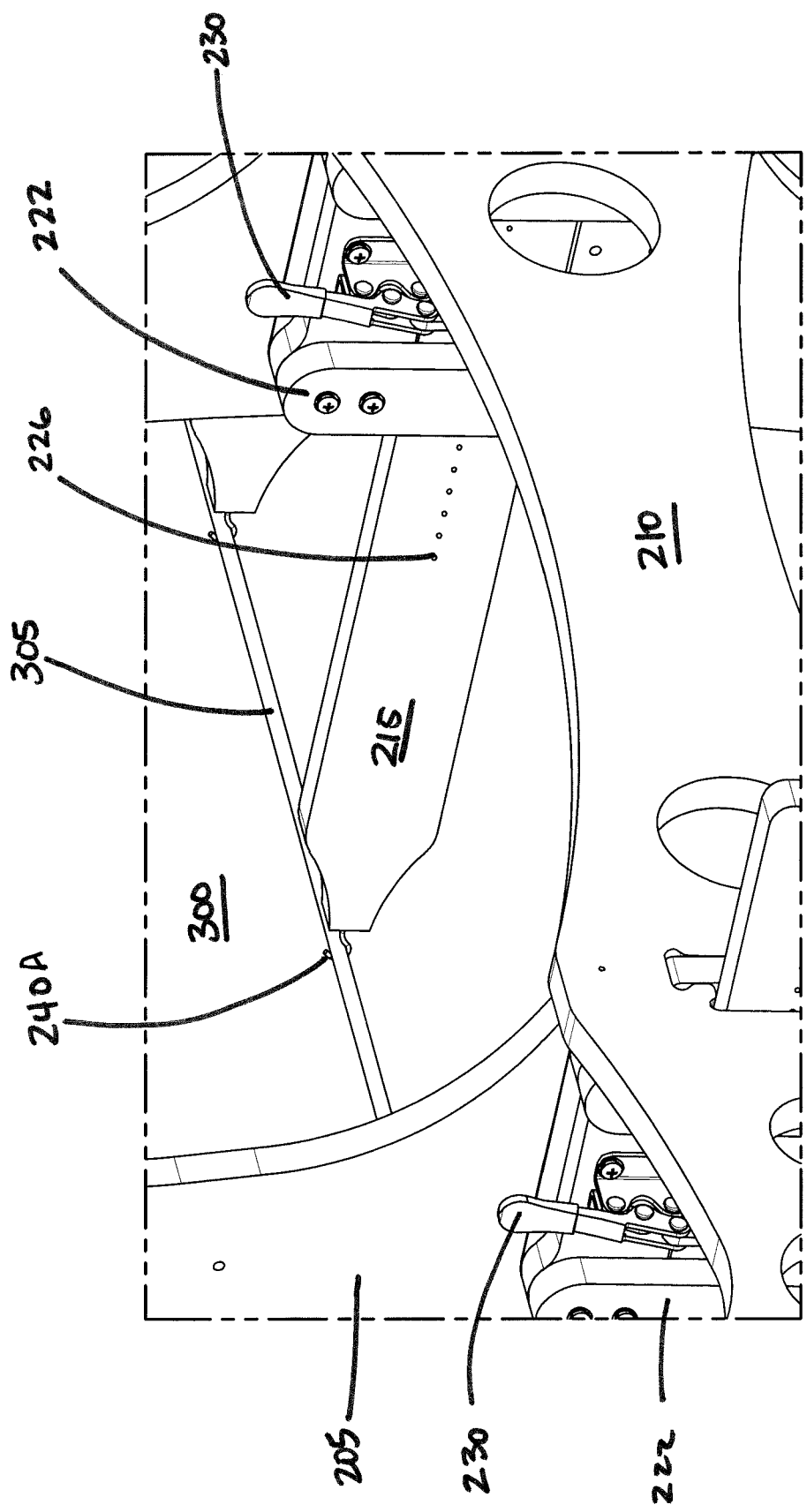
FIGS. 6A and 6B show additional close-up perspective views of the invention of FIG. 1 showing an arm engaging a rod in alternate embodiments.
Figure 6B:
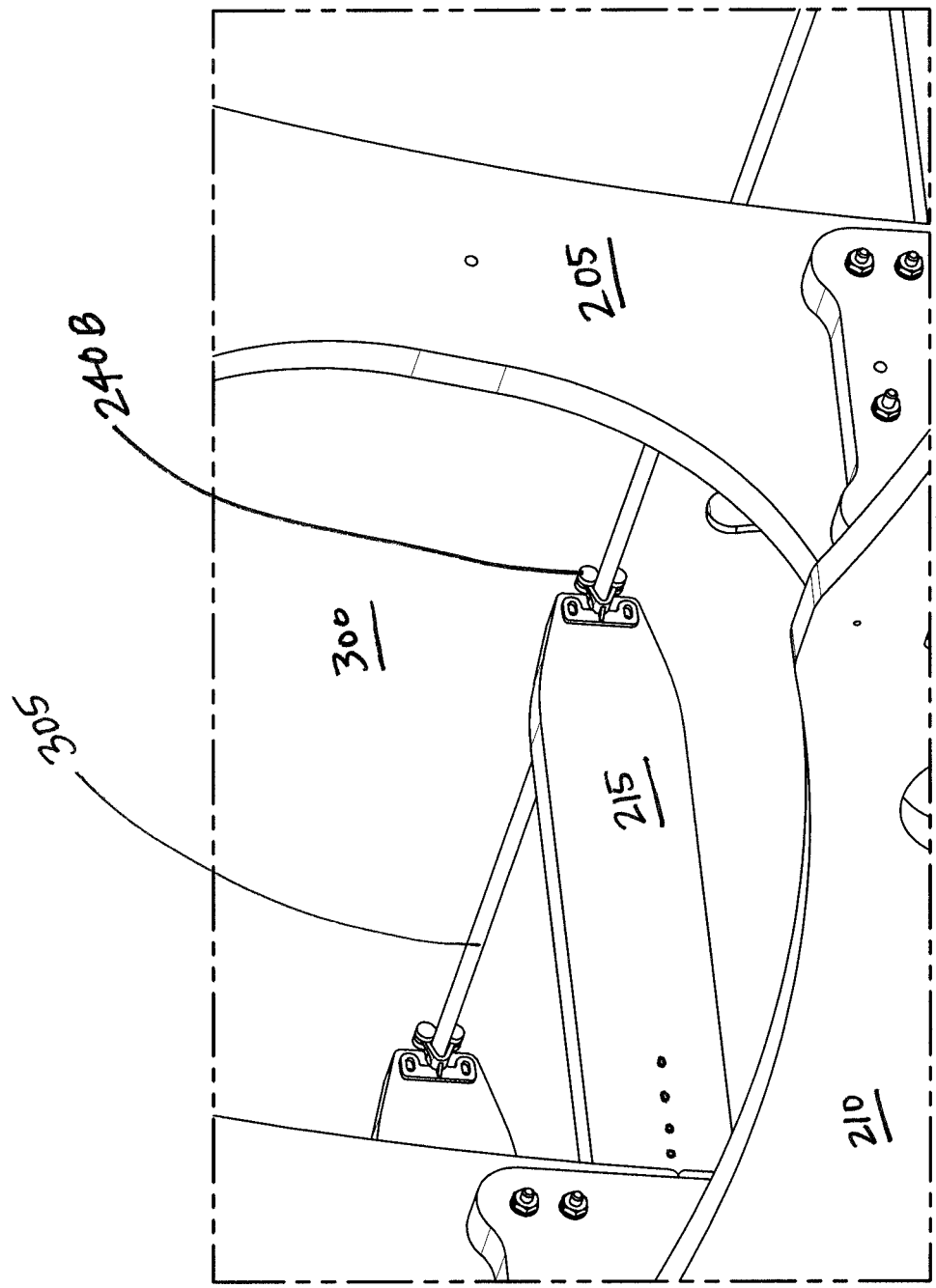

Each arm 215 may be equipped with a latch 240 on a distal end for grasping the fabric 300. The latch 240 may be, for example, a hook 240A (as shown in FIG. 6A) or a clasp defined by opposing rollers 240B (as shown in FIG. 68). Laterally spaced rods 305 may be sewn into, or otherwise secured to, the fabric 300. The latch 240 may engage the rods 305, thus pulling the fabric 300 toward the frame 200 to the approximate shape of the structure to be replicated. Thus, together the frame 200 and the fabric 300 model the free space within the simulated structure. Modeling software, such as CATIA® (3D CAD design product), may be used to develop a template indicating approximately where the rods 305 should be secured to the fabric 300. Alternately, the latches 240 may directly engage the fabric 300 without having rods 305.

The number of brackets 220 and arms 215 required may be determined by shape of the structure to be simulated. For example, as shown in FIG. 1, brackets 220 are secured at intervals around the entire length of the girders 205 to allow the latches 240 to pull the fabric 300 into an arc resembling the shape of an aircraft cabin.

Many types of material 300 may be used to accomplish the flexible panel 300 in the mock-up assembly. As noted above, the panel 300 could comprise any material that is flexible when acted on by forces, and is thus repositionable.

However, it may be realized by those skilled in the art that a fabric 300 having a high elasticity may be preferable so as to accommodate the stretching necessary to create an accurate representation of a structure and to allow for revisions to the design. Additionally, it may be realized that a fabric 300 that allows light to escape through the fabric may be preferable so that the light from the outside of the fabric may be sufficient to light the inside of the mock-up.

As shown in FIG. 7, in addition to arms 215 with latches 240, contoured branch 217 may be used to simulate depressions in the structure, such as overhead compartments. The contoured branch 217 may be substantially similar to the arms 215, though the distal end of the contoured branch 217 may be equipped with a shaped end 219 rather than a latch 240. The contoured branch 217 may be secured into the bracket 220 in the same manner as arm 215. While the arms 215 pull the fabric 305 into the desired shape, the shaped end 219 of the contoured branch 217 may press against the fabric 305 to form depressions in the fabric simulating, for example, overhead bins in an aircraft cabin. This may allow designers to quickly ascertain issues in the design and to make changes as necessary.

The mock-up may be built to scale to hold furnishings such as aircraft compliant seats and tables. The frame 200 may be further configured to take into account door openings and other structural features. Once in the mockup is complete, designers can move throughout the structure and make adjustments as necessary. Revisions in the design of the structure can be easily and inexpensively made.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An adjustable interior mockup for simulating a three-dimensional replica representing internal surface dimensions for a proposed aircraft structure, comprising:
   a frame internally supporting a flexible sheet of material, the frame comprising a plurality of girder members, each of the plurality of girder members curved to form an arc shape;
   a plurality of arms adjustably secured by a respective one of a plurality of mechanical couplers to the plurality of girder members, such that each one of the plurality of arms may independently be retracted outwardly or extended inwardly with respect to the arc shape;
   wherein each of the plurality of arms comprises:
      an inner end having either:
         a) a latch adapted for grasping the flexible sheet of material; or
         b) a shaped end adapted for pressing the flexible sheet of material; and
      the flexible sheet of material being configurable into an envelope portion by positioning each of the plurality of arms outwardly or inwardly, the inner end of each one of the plurality of arms either pulling the flexible sheet of material outwardly via the latch or pressing the flexible sheet of material inwardly via the shaped end, thereby forming the envelope portion comprising the shape of the internal surface dimensions for a proposed aircraft structure.

2. The system of claim 1 wherein each of the plurality of arms further comprises a clamping member enabling each of the plurality of arms to be clampable into different outwardly extended or inwardly retracted positions, thereby making the flexible sheet of material movable and then securable for conforming to the internal surface dimensions.

3. The system of claim 1 further comprising a plurality of rods, wherein the flexible sheet of material is constructed of fabric and the plurality of rods are included into the fabric, each of the plurality of rods being receivable onto at least one of the plurality of latches, such that each of the rods forms a feature in the internal envelope dimensional configuration of one of the proposed plurality of aircraft designs.

4. The system of claim 1 wherein the latch comprises a clasp having opposing rollers.

5. The system of claim 1 wherein the latch comprises a hook.

6. A system for representing an aircraft interior, the system comprising:
   a frame on a base;
   a plurality of arms translatable radially inwardly and outwardly relative to the frame;
   a flexible elastic sheet adapted for forming an internal envelope dimensional configuration to represent one of a plurality of proposed aircraft designs;
   a plurality of latches each respectively coupled to a first end of one of the plurality of arms, each of the latches being adapted to removably grasp the flexible elastic sheet; and
   a plurality of mechanical couplers adapted to respectively support each of the plurality of arms on the frame, wherein each of the mechanical couplers enables independent translation of a respective one of the arms, such that the plurality of arms are positioned to push or pull the flexible elastic fabric for forming the internal envelope dimensional configuration of one of the proposed plurality of aircraft designs.

7. The system of claim 6 further comprising a plurality of rods sewn into a fabric used to construct the flexible elastic sheet, each of the plurality of rods being selectively receivable onto at least one of the plurality of latches, such that each of the rods constrains the position of a portion of the flexible elastic sheet.

8. The system of claim 6 wherein the frame comprises a plurality of spaced-apart girder members extending upward from the base, and a plurality of struts spanning laterally between the girder members.

9. The system of claim 6 further comprising a plurality of clamping members each coupled to a respective one of the plurality of arms, wherein each clamping member is configured to enable its respective arm to be a) translatable inwardly and outwardly and b) securable, thereby enabling the flexible elastic sheet to match the internal envelope dimensional configuration of one of the proposed plurality of aircraft designs.

10. The system of claim 6 wherein the inside end of at least one of the arms in the plurality has a shaped end, the shaped end being pressed into an outside surface of the flexible elastic panel to form depressions that extend inwardly into the flexible elastic panel to simulate an inwardly protruding feature of one of the plurality of proposed aircraft designs.

11. The system of claim 6 wherein the arms have position indicators enabling a user to determine a relative position into which the arm has been translated.

* * * * *